United States Patent [19]

Sakagami et al.

[11] Patent Number: 5,065,052

[45] Date of Patent: Nov. 12, 1991

[54] ARBITER CIRCUIT USING PLURAL-RESET RS FLIP-FLOPS

[75] Inventors: Masahiko Sakagami, Takatsuki; Hideki Kawai, Nagaokakyo, both of Japan

[73] Assignee: Matsushita Electric Industrial Co., Ltd., Osaka, Japan

[21] Appl. No.: 538,244

[22] Filed: Jun. 14, 1990

[30] Foreign Application Priority Data

Jun. 14, 1989 [JP] Japan .................................. 1-151813

[51] Int. Cl.[5] .......................................... H03K 17/16
[52] U.S. Cl. .................................... 307/480; 307/443; 364/200; 365/189.04
[58] Field of Search ............ 307/443, 480, 590, 272.2; 328/110; 364/200 MS File; 365/189.04, 230.05

[56] References Cited

U.S. PATENT DOCUMENTS

| | | | |
|---|---|---|---|
| 4,314,335 | 2/1982 | Pezzi | 364/200 MS |
| 4,398,101 | 8/1983 | Friauf | 328/110 X |
| 4,451,881 | 5/1984 | Grice et al. | 364/200 MS |
| 4,757,217 | 7/1988 | Sawada et al. | 307/480 |
| 4,864,243 | 9/1989 | Reese | 328/110 |
| 4,918,664 | 4/1990 | Platt | 365/230.05 |
| 4,967,398 | 10/1990 | Jamoua et al. | 365/189.04 X |
| 4,987,559 | 1/1991 | Miyauchi et al. | 365/189.04 |
| 4,998,027 | 3/1991 | Mihara et al. | 307/272.2 X |

FOREIGN PATENT DOCUMENTS 0146181 6/1990 Japan .............................. 365/230.05

Primary Examiner—David Hudspeth
Attorney, Agent, or Firm—Ratner & Prestia

[57] ABSTRACT

This invention is realized, in sum, by providing at least one reset input terminal, aside from a reset input terminal to which a request end signal is supplied, to output stage RS flip-flops of plural latch circuits to which plural request signals are supplied respectively. The signal of a first output terminal of the output stage RS flip-flop of a specified latch circuit of the plural latch circuits is supplied to a reset input terminal of the output stage RS flip-flop of the other latch circuit and a delay circuit is connected between a second output terminal and the other reset input terminal of the output stage RS flip-flops of each latch circuit. Accordingly, if plural resquest signals are supplied at substantially the same time, the competition of these request signals may be settled. Besides, by setting the delay time of each delay circuit longer than the time required from the supply of the signal to the set input terminal of the corresponding output stage RS flip-flop until the signal is latched in the output terminal, even if pulsive signals are supplied to the output stage RS flip-flops, oscillation of the output stage RS flip-flops may be prevented.

8 Claims, 13 Drawing Sheets 5,065,052

1

ARBITER CIRCUIT USING PLURAL-RESET RS FLIP-FLOPS

BACKGROUND OF THE INVENTION

The present invention relates to an arbiter circuit for settling the competition of two or more request signals.

An arbiter circuit is intended to settle the competition of two or more request signals fed into a specific circuit, and to select any one of the request signals. For example, it is used for the purpose of preventing malfunction of semiconductor memory or destruction of the data by settling the competition of a write request signal and a read request signal for a semiconductor, memory, or competition of a write request signal, a read request signal and a refresh request signal. Two or more request signals may be either synchronized with each other or nonsynchronized.

Recently as video appliances have become more and more advanced in function, their system control has become very difficult. For instance, when using a dynamic random access memory (DRAM) as a field memory in a video tape recorder, writing and reading of data on the DRAM must be done simultaneously, but the DRAM cannot execute writing and reading of data at the same time. Accordingly it is necessary to settle the competition of the write request signal and read request signal to the DRAM so as to carry out either the write request or the read request.

FIG. 9 is a block diagram showing a conventional arbiter circuit, and FIG. 10 is a block diagram showing an RS flip-flop used in the arbiter circuit shown in FIG. 9.

The RS flip-flop in FIG. 10 is composed of first and second NOR gates 100, and 101 respectively possessing two input terminals each. The output terminal of the first NOR gate 100 is connected to one of the input terminals of the second NOR gate 101, while the output terminal of the second NOR gate 101 is connected to one of the input terminals of the first NOR gate 100. To the other input terminals of the first and second NOR gates 100, 101, a reset signal R and a set signal S are supplied respectively. From the first and second NOR gates 100, 101, output signals Q and NQ are delievered.

The RS flip-flop in FIG. 10 has one set input terminal and one, reset input terminal, and hereinafter this is called a 1R-RS flip-flop.

FIG. 9 shows a conventional arbiter circuit using the 1R-RS flip-flop. In FIG. 9 RS flip-flops from a first RS flip-flop 102 to a fourth RS flip-flop 105 are all composed of 1R-RS flip-flops as shown in FIG. 10. A request signal A is fed to the set input terminal S of the first RS flip-flop 102, and a reset signal A is fed to the reset input terminal R of the first RS flip-flop. An output signal A1 of the first RS flip-flop 102 is supplied to one of the input terminals of a first AND gate 106. An output signal A2 of the first AND gate 106 is supplied to the set input terminal S of the second RS flip-flop 103. From a first output terminal Q of the second RS flip-flop 103, an accept signal A is delivered.

A first latch circuit 107 is composed of these first and second RS flip-flops 102, 103 and first AND gate 106.

On the other hand, a second latch circuit 109 is composed of third and fourth RS flip-flops 104, 105 and second AND gate 108. The connecting configuration in the second latch circuit 109 is same as that in the first latch circuit 107. A request signal B is fed to the set input terminal S of the third RS flip-flop 104, while a

2 reset signal B is fed to the reset input terminal R. An accept signal B is delivered from the first output terminal Q of the fourth RS flip-flop 105.

The accept signals A, B are supplied to the input terminals of the NOR gate 110, and the output signal NAB of the NOR gate 110 is supplied to the other input terminals of the first and second AND gates 106, 108.

To the reset input terminals R of the second and fourth RS flip-flops 103, 105, a common request end signal is supplied from an external circuit of the arbiter circuit (for example, a memory block in a DRAM circuit).

FIG. 11 is a timing chart for explaining the basic operation of the arbiter circuit shown in FIG. 9.

FIG. 11 shows potential waveforms of each node when, to the arbiter circuit of FIG. 9, (1) the request signal A is fed, and after a specific time the reset signal A is fed;

(2) the request signal A is fed and after that the request signal B is fed, then after a specific time the reset signal B is fed; and (3) either one of the request signal A or B is accepted, and after a specific time the request end signal is fed.

Referring to FIG. 11, the basic operation of the arbiter circuit in FIG. 9 is described below.

In the first place, when the request signal A is supplied to the set input terminal S of the first RS flip-flop 102, the output signal A1 of the first RS flip-flop 102 becomes H level (High) At this time, the accept signals A, B are both at L level (Low) and the output signal NAB of the NOR gate 110 is at H level, and hence the signal of the set input terminal S of the second RS flip-flop 103 becomes H level. As a result, the accept signal A becomes H level, and the request signal A is accepted.

Next, while the accept signal A is at H level, when request signal B is supplied to the set input terminal S of the third RS flip-flop 104, the output signal B1 of the third RS flip-flop 104 becomes H level. In this state, however, since the accept signal A is at H level, the output signal NAB of the NOR gate 110 is at L level. Accordingly, the set input terminal S of the fourth RS flip-flop 105 remains at L level, and the accept signal B also stays at L level.

Upon lapse of a sepcific time after the accept signal A has become H level, when the reset signal A from an external circuti is supplied to the reset input terminal R of the first RS flip-flop 102, the output signal Al is reset and becomes L level. At this timing, however, since the accept signal B is at L level, the reset signal B is not supplied to the reset terminal R of the thrid RS flip-flop 104. As a result, the output signal B1 of the third RS flip-flop 104 remains at H level.

Furthermore, nearly at the same timing as the request signal B, a request end signal from an external circuit is supplied to the reset input terminals R of the second and fourth RS flip-flops 103, 105, and therefore the output signal Q of the second RS flip-flop 103 is reset, and the accept signal A becomes L level. In consequence, the output signal NAB of the NOR gate 110 becomes H level, and the set input terminal S of the fourth RS flip-flop 105 becomes H level, so that the accept signal B changes to H level. Thus, the request signal B is accepted.

According to the arbiter circuit shown in FIG. 9, as described herein, even when request signal B is fed while the accept signal A is at H level by request signal A, the competition of the two request signals A, B is settled, and only one of them can be accepted.

Meanwhile, in the arbiter circuit in FIG. 9, there is no particular problem as far as one request signal (for example A) is accepted, and the other request signal (for example B) is fed after the output signal NAB of the NOR gate 110 is changed to L level, or, to the contrary, the request signal B is first accepted and the other request signal A is fed after the output signal NAB of the NOR gate 110 is changed to L level.

However, if the two request signals A, B are fed almost simultaneously to the arbiter circuit, the disturbance as shown in FIG. 12 takes place. That is, when the request signals A, B are simultaneously fed to the arbiter circuit, the output signals A1, B1 of the first and third RS flip-flops 102, 104 both become H level. At this moment, both accept signals A, B are at L level and the output signal NAB of the NOR gate 110 is at H level, and hence the set input terminals S of the second and fourth RS flip-flops 103, 104 are both at H level, so that both request signal A and request signal B are accepted.

Thus, in the arbiter circuit in FIG. 9, when two request signals A, B are fed nearly at the same time, the intrinsic specification of the arbiter circuit of settling the competition of two requests and selecting one of them is not satisfied.

Moreover, as one request signal A is fed to the arbiter circuit, just before the accept signal A becomes H level and the output signal NAB of the NOR gate 110 becomes L level, if another request signal B is fed to the set input terminal S of the third RS flip-flop 104 and the output signal B1 of the third RS flip-flop 104 becomes H level, such disturbance as shown in FIG. 13 occurs.

That is, right after the output signal B1 of the third RS flip-flop 104 becomes H level, the output signal NAB of the NOR gate 110 becomes L level, and hence the output signal B2 of the second AND gate 108 becomes pulsive. If the pulse width of this pulse is shorter than the delay time from the moment of supply of signal B2 to the set input terminal S of the fourth RS flip-flop 105 until the output signal (accept signal B) is latched, this pulse continues to propagate between two NOR gates 100, 101 (see FIG. 10) in the fourth RS flip-flop 105, and therefore the fourth RS flip-flop 105 oscillates.

To the contrary, as one request signal B is fed to the arbiter circuit, just before the accept signal B becomes H level and the output signal NAB of the NOR gate 110 becomes L level, if the other request signal A is supplied to the set input terminal S of the first RS flip-flop 102 and its output signal A1 becomes H level, the output signal (accept signal A) of the second flip-flop 103 oscillates.

It is hence a primary object of the invention to solve such problems and present an arbiter circuit capable of adjusting plural competing request signals even if the plural request signals are substantially fed at the same time, or if the time difference of the plural request signals is very small.

SUMMARY OF THE INVENTION

In sum, the invention is realized by providing one or more reset input terminals, aside from the reset input terminal to which the request end signal is supplied, in the output stage RS flip-flop of plural latch circuits to which plural request signals are supplied. The signal of the first output terminal of the output stage RS flip-flop of a specific latch circuit out of the plural latch circuits is supplied to the reset input terminal of the output stage RS flip-flop of the other latch circuit, while a delay circuit is connected between the second output terminal of the output stage RS flip-flop of each latch circuit and the reset input terminal.

Thus, if plural request signals are supplied substantially at the same time, the competition of these request signals may be settled. Besides, when the delay time of each delay circuit is set longer than the time required from the moment of supply of signal to the set input terminal of the corresponding output stage RS flip-flop until the signal is latched in the output terminal, even if a pulsive signal is supplied to the RS flip-flop of each output stage, oscillation of each output stage RS flip-flop may be prevented.

DETAILED DESCRIPTION OF THE INVENTION

Figure 1:
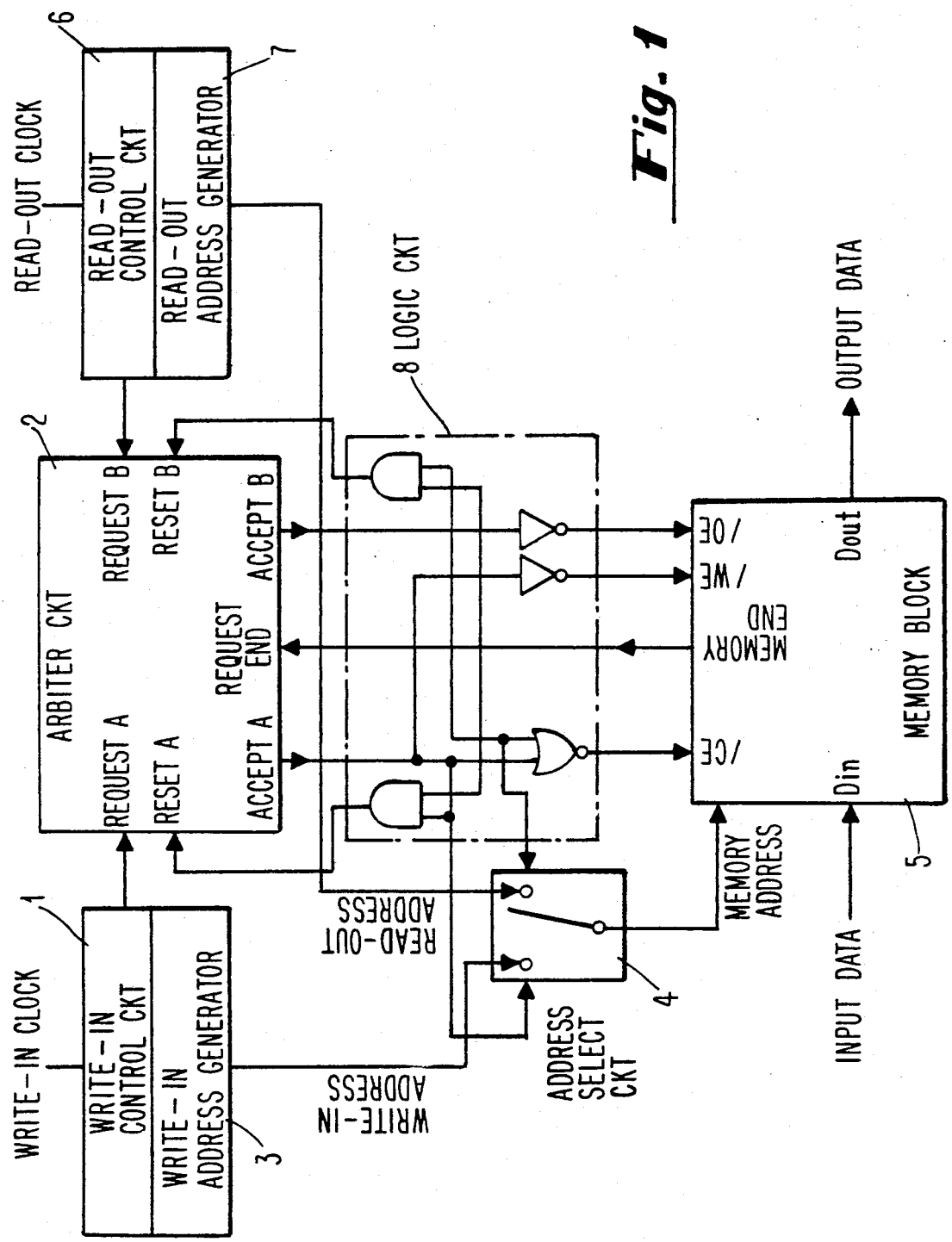
FIG. 1 is a circuit diagram showing a memory circuit incorporating an arbiter circuit in a first embodiment of the invention.

FIG. 1 is a block diagram of a memory circuit incorporating an arbiter circuit in a first embodiment of the invention.

In FIG. 1, in write mode, according to the write clock, a write request signal A is supplied from a write control circuit 1 to an arbiter circuit 2. A write address from a write address generator circuit 3 is supplied to a memory block 5 through an address selector circuit 4. In read mode, on the other hand, according to the read clock, a read request signal B is supplied from a read control circuit 6 to the arbiter circuit 2. A read address from a read address generator circuit 7 is supplied to the memory block 5 through the address selector circuit 4.

If, at this time, the write request and read request should compete, this competition is settled in the arbiter circuit 2, and only one request is accepted. For example, when the write request is accepted, the accept signal A from the arbiter circuit 2 is supplied to the memory block 5 through a logic circuit 8, and the input data is written into a specified memory cell in the memory block 5 according to the memory address from the address selector circuit 4. On the other hand, when the read request is accepted, the accept signal B from the arbiter circuit 2 is supplied to the memory block 5 through the logic circuit 8, and the data stored in the specified memory cell in the memory block 5 is read out according to the memory address from the address selector circuit 4.

Figure 2:
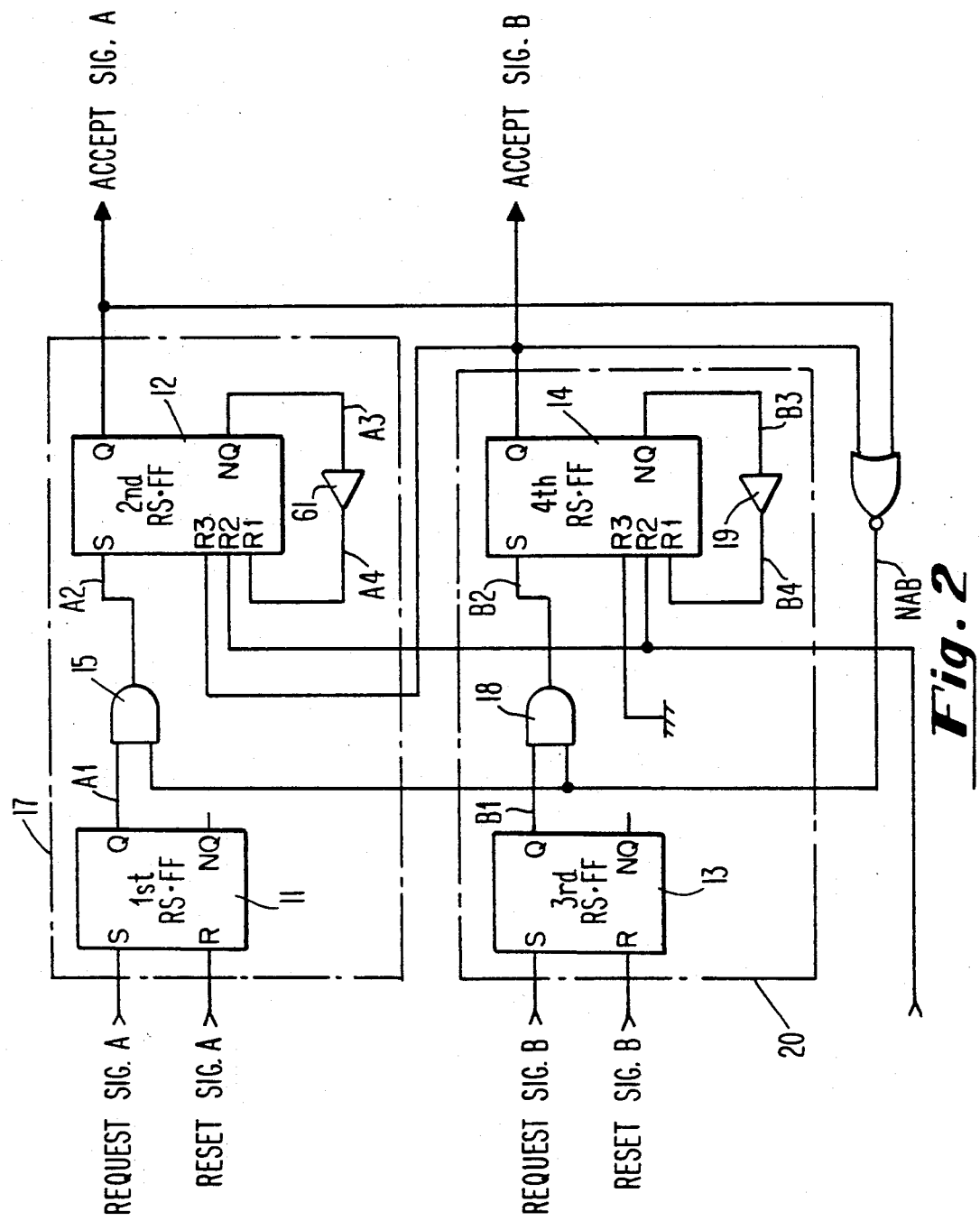
FIG. 2 is a block diagram of the arbiter circuit in the first embodiment of the invention.
Figure 3:
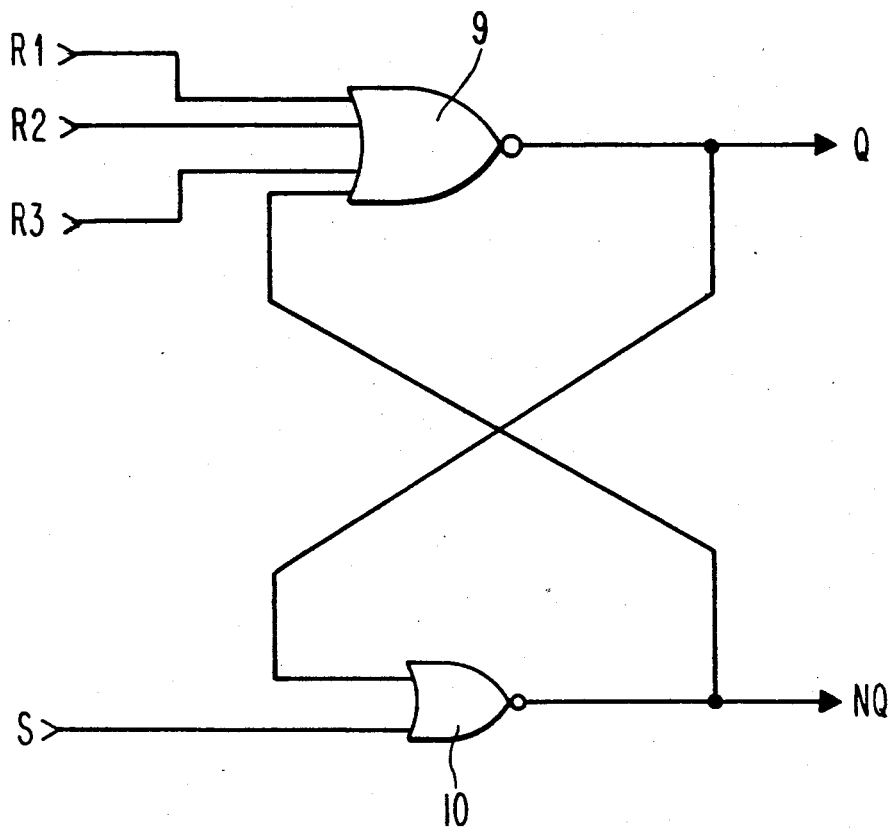
FIG. 3 is a block diagram showing an RS flip-flop used in the embodiment in FIG. 2.

FIG. 2 is a block diagram of the arbiter circuit in the first embodiment of the invention which is incorporated in the memory circuit in FIG. 1. FIG. 3 is a block diagram of an RS flip-flop used in the arbiter circuit in FIG. 2.

The RS flip-flop shown in FIG. 3 is composed of a first NOR gate 9 having four input terminals, and a second NOR gate 10 having two input terminals. The output terminal of the first NOR gate 9 is connected to one of the input terminals of the second NOR gate 10, and the output terminal of the second NOR gate 10 is connected to one of the input terminals of the first NOR gate 9. To the remaining three input terminals of the first NOR gate 9, reset signals R1, R2 and R3 are supplied, respectively. To the other input terminal of the second NOR gate 10, a set signal S is supplied. From the first and second NOR gates 9 and 10, output signals Q and NQ are delivered, respectively.

The RS flip-flop in FIG. 3 has one set input terminal and three reset input terminals, and it is hereinafter called 3R-RS flip-flop.

FIG. 2 shows the arbiter circuit in the first embodiment of the invention, using the 3R-RS flip-flop in FIG. 3. In FIG. 2, a first RS flip-flop (input state RS flip-flop) 11 and a third RS flip-flop (input stage RS flip-flop) 13 are composed of the 1R-RS flip-flop used in the conventional arbiter circuit. On the other hand, a second RS flip-flop (output stage RS flip-flop) 12 and a fourth RS flip-flop (output stage RS flip-flop) 14 are composed of the 3R-RS flip-flop shown in FIG. 3.

A request signal A is fed to the set input terminal S of the first RS flip-flop 11, and a reset signal A is fed to its reset terminal R. The output signal A1 of the first RS flip-flop 11 is supplied to one of the input terminals of a first AND gate 15. The output signal A2 of the first AND gate 15 is supplied to the set input terminal S of the second RS flip-flop 12. The first output terminal Q of the second RS flip-flop 12 delivers an accept signal A. A first delay circuit 16 is connected between the second output terminal NQ and reset input terminal R1 of the second RS flip-flop 12. A first latch circuit 17 is composed of these first and second RS flip-flops 11, 12, the first AND gate 15, and the first delay circuit 16.

On the other hand, a second latch circuit 20 is composed of the third RS flip-flop 13, fourth RS flip-flop 14, second AND gate 18, and second delay circuit 19. The connecting configuration in the second latch circuit 20 is the same as in the first latch circuit 17. A request signal B is fed to the set input terminal S of the third RS flip-flop 13, and a reset signal B is fed to its reset input terminal R. The first output terminal Q of the fourth RS flip-flop 14 delivers an accept signal B.

The accept signals A, B are fed to the input terminal of the NOR gate 21, and the output signal NAB of the NOR gate 21 is supplied to the other input terminal of the first and second AND gates 15, 18. To the reset input terminals R2, R2 of the second and fourth RS flip-flops 12, 14, a request end signal is supplied from the memory block 5 shown in FIG. 1 through the logic circuit 8. To the reset input terminal R3 of the second RS flip-flop 12, the accept signal B is supplied, and the reset input terminal R3 of the fourth RS flip-flop 14 is grounded.

Figure 11:
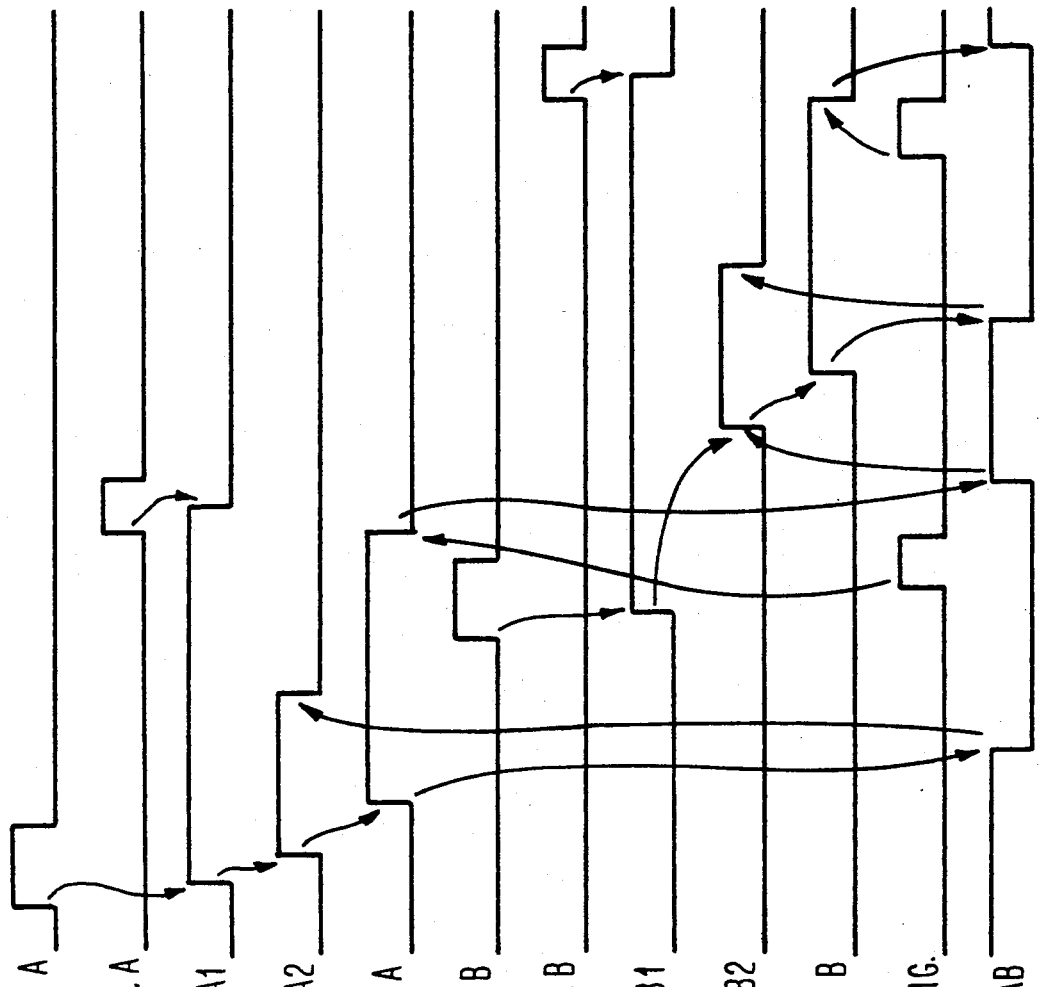
FIG. 11 is a timing chart for explaining the operation of the conventional artbiter circuit in FIG. 9.
Figure 12:
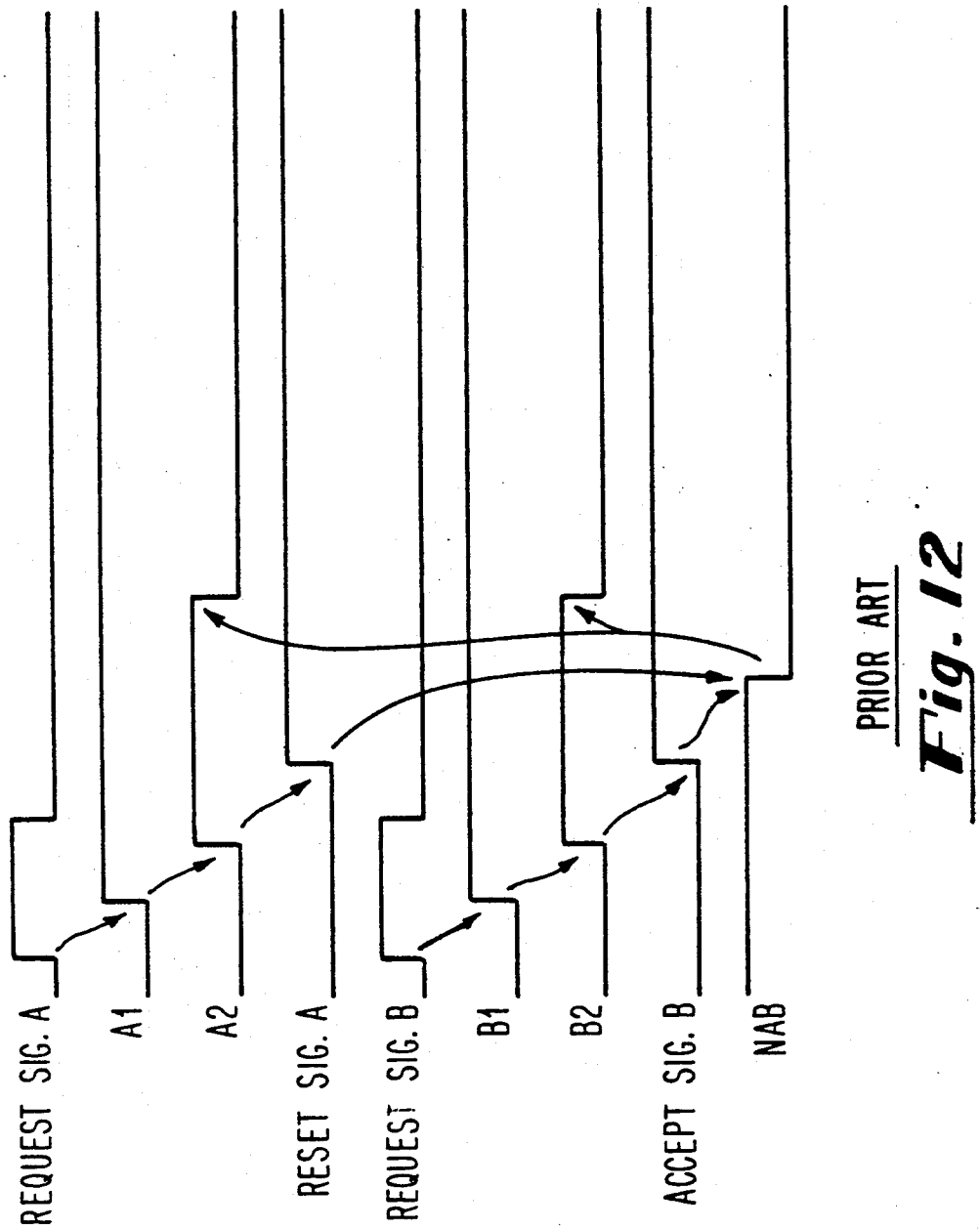
FIG. 12 is a timing chart for explaining the operation of the conventional arbiter circuit in FIG. 9.
Figure 13:
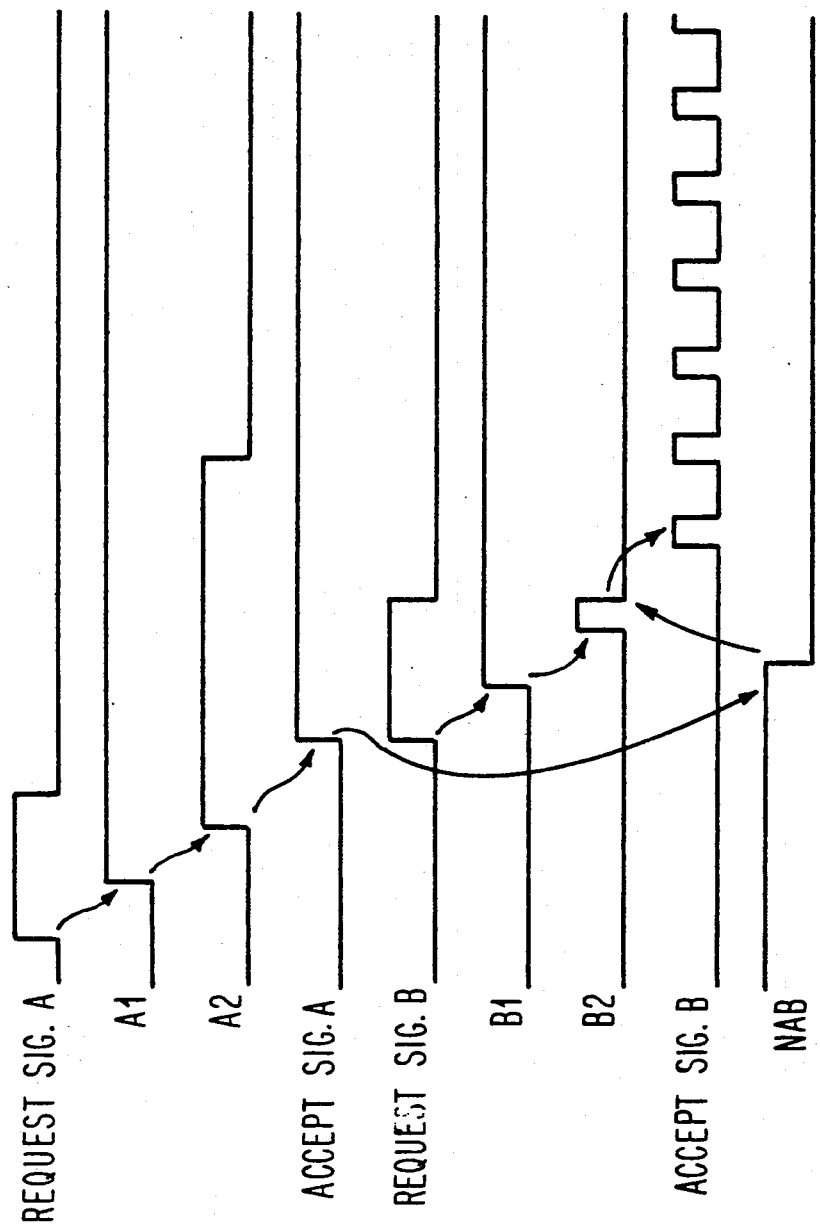
FIG. 13 is a timing chart for explaining the operation of the conventional arbiter circuit in FIG. 9.

In the arbiter circuit in FIG. 2, when two requests A, B are entered in the timing shown in FIG. 11, the operation is the same as in the prior art. That is, after the request A is accepted, the output signal NAB of the NOR gate 21 becomes L level, and then the request B is entered, or after the request B is accepted, the output signal NAB of the NOR gate 21 becomes L level, and then the request B is entered, the competition of the requests A, B is settled as in the prior art, and only one of the requests is selected.

Figure 4:
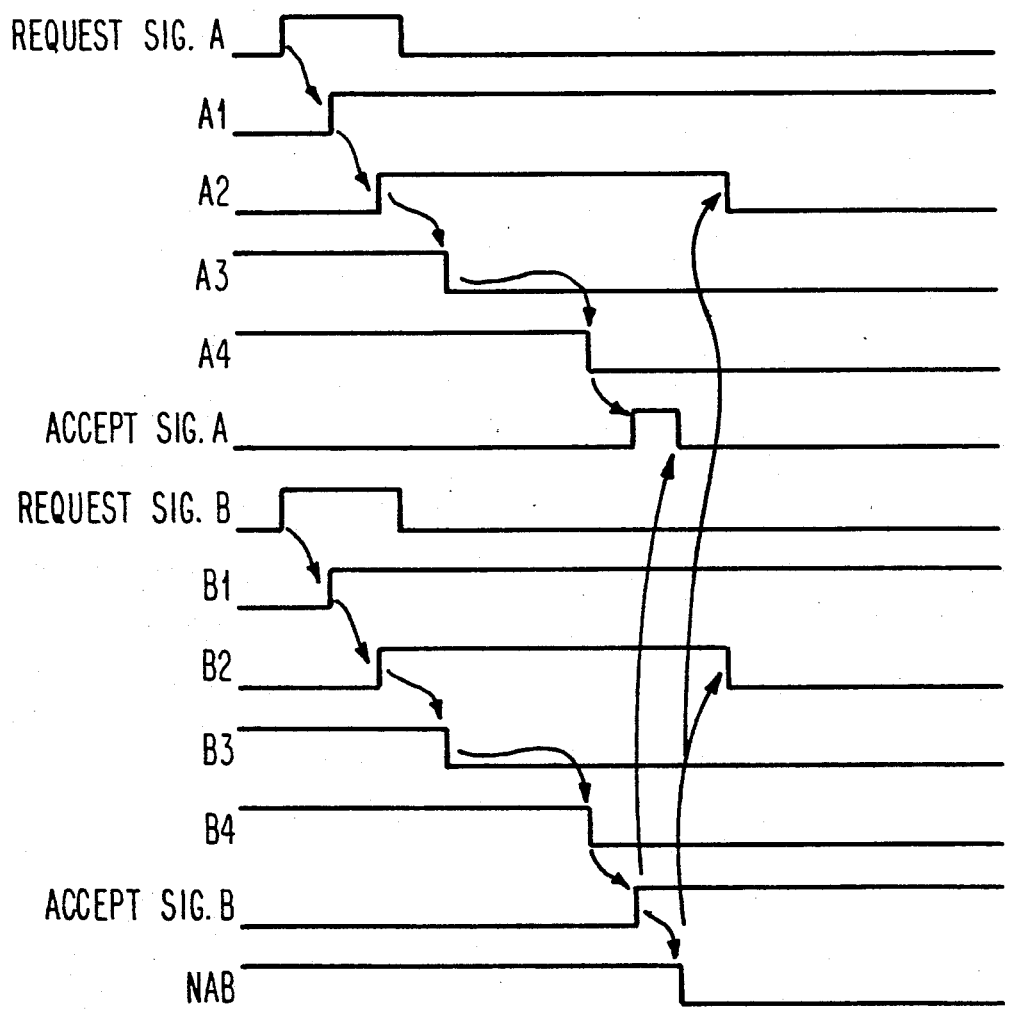
FIG. 4 is a timing chart for explaining the operation of the first embodiment of the invention shown in FIG. 2.

The operation in the timing causes a disturbance in the conventional arbiter circuit, that is, the operation when the requests A and B are entered substantially at the same time is described below while referring to FIG. 4.

When the requests A, B are simultaneously entered in to the arbiter circuit, the output signals A1, B1 of the first and third RS flip-flops 11, 13 are both set to H level. At this moment, the accept signals A, B are both at L level and the output signal NAB of the NOR gate 21 is at H level, and therefore the output signals A2, B2, of the first and second AND gates 15, 16 are both at H level. As a result, the output signals A3, B3 from the output terminals NQ of the second and fourth RS flip-flops 12, 14 are both at L level. Furthermore, when the output signals A4, B4 of the first and second delay circuits 16, 19 both become L legel, all reset input terminals R1 to R3 of the second and fourth RS flip-flops 12, 14 become L level, and therefore, the accept signals A, B at the output terminals Q of the second and fourth RS flip-flops 12, 14 are both set at H level. However, as the accept signal B becomes H level, the reset input terminal R3 of the second RS flip-flop 12 becomes H level and the accept signals A is reset to L level. As a result, only the request signal B is accepted, the request signal A is not accepted.

In this way, according to the arbiter circuit in FIG. 2, even if two requests A, B are entered nearly at the same time, both of the requests A, B will not be accepted, and the mutually competing two requests are adjusted, and one is selected, which satisfies the intrinsic specification of the arbiter circuit.

Figure 5:
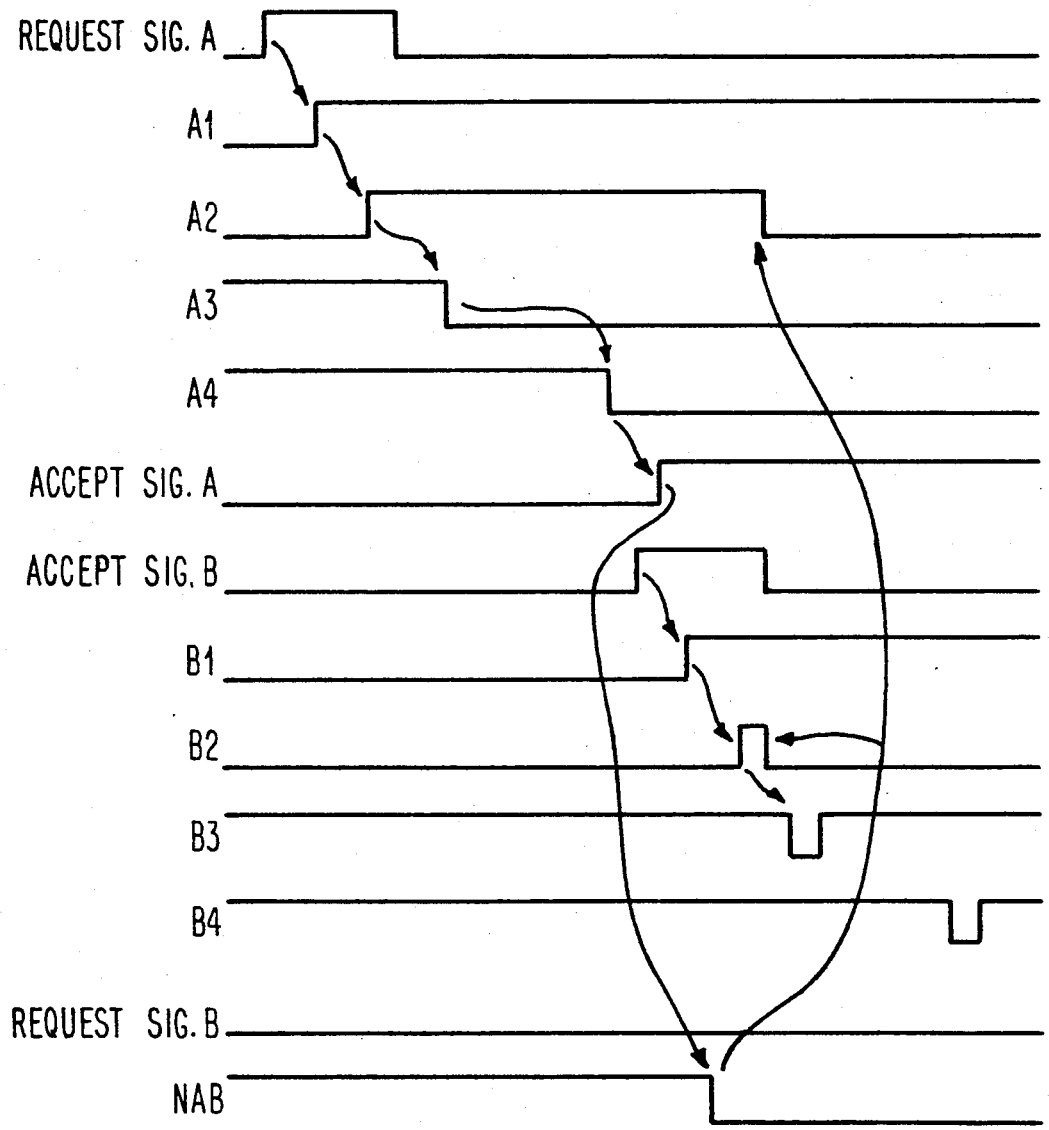
FIG. 5 is a timing chart for explaining the operation of the first embodiment of the invention shown in FIG. 2.

Referring next to FIG. 5, the operation is explained in the case that a second request signal B is entered in the third RS flip-flop 13 to cause the output signal B1 of the third RS flip-flop 13 to become H level, just before the accept signal A becomes H level and the output signal NAB of the NOR gate 21 becomes L level, after a first request signal A is entered in the arbiter circuit.

In this case, right after the output signal B1 of the third RS flip-flop 13 becomes H level, the output signal NAB of the NOR gate 21 is set to L level. Accordingly, as in the conventional arbiter circuit, the output signal B2 of the second AND gate 18 becomes pulsive. Consequently, the output signal B3 from the output terminal NQ of the fourth RS flip-flop 14, also becomes pulsive. In this case, when the delay time of the second delay circuit 19 is set longer than the delay time from the supply of signal B2 to the set input terminal S of the fourth RS flip-flop 14 until the output signal (accept signal B) is latched, the reset input terminal R1 and output terminal NQ of the fourth RS flip-flop 14 are not both set to L level at the same time. Hence, unlike the conventional arbiter circuit, the fourth RS flip-flop 14 will not oscillate.

Figure 6:
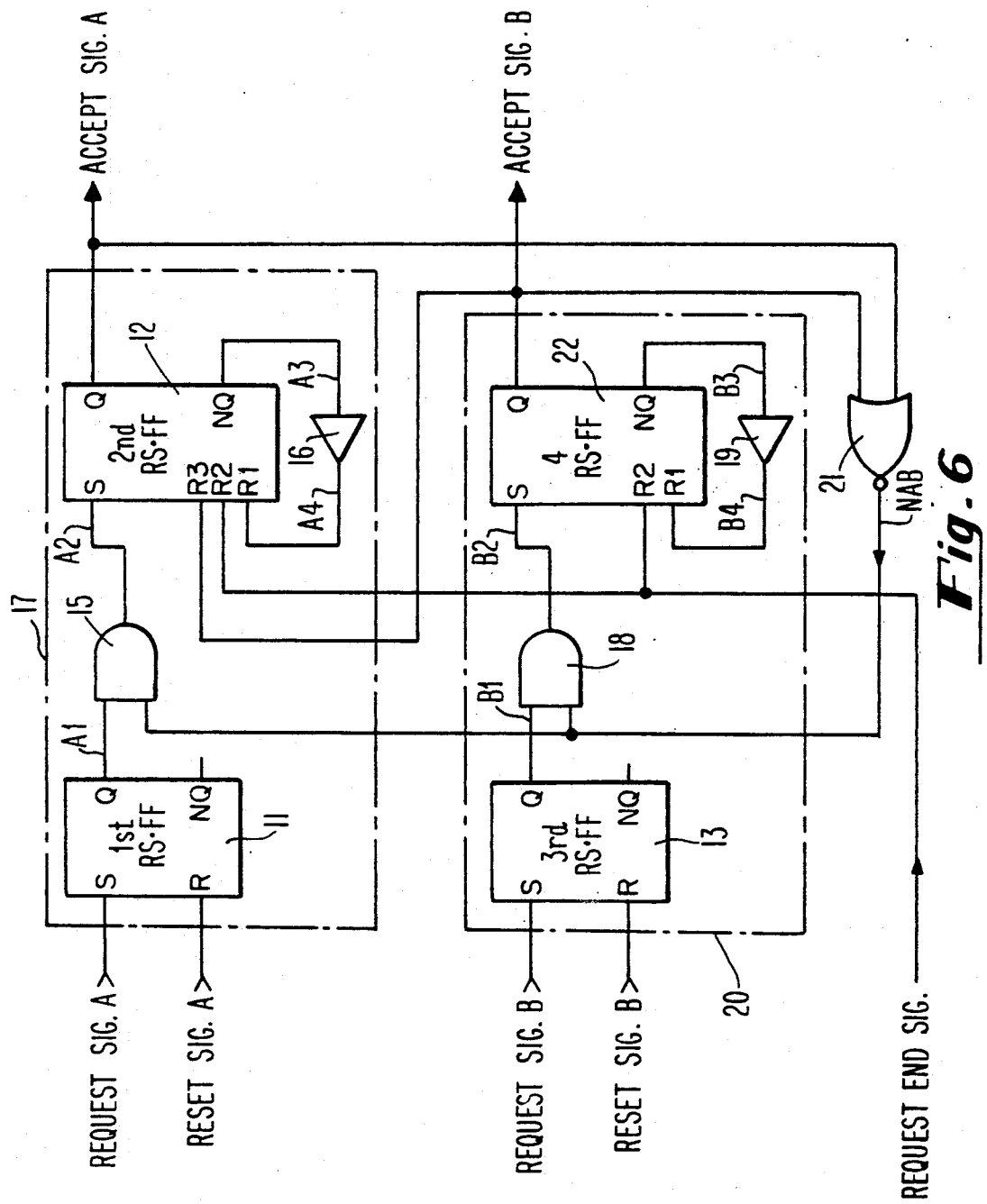
FIG. 6 is a block diagram of an arbiter circuit in a second embodiment of the invention.

FIG. 6 is a block diagram of an arbiter circuit in a second embodiment of the invention. In FIG. 6, the blocks having substantially equivalent functions to those in FIG. 2 are identified with the same reference numbers as in FIG. 2, and their explanations are not repeated. In FIG. 6, what is different from FIG. 2 is the, composition of the fourth RS flip-flop 22 by using a 2R-RS flip-flop. That is, the fourth RS flip-flop 22 has two reset input terminals R1, R2, and a request end signal is supplied to one reset input terminal R2, and an output signal B4 of the second delay circuit 19 is supplied to the other reset input terminal R1.

In this configuration, the same function as in the embodiment in FIG. 2 is realized.

Figure 7:
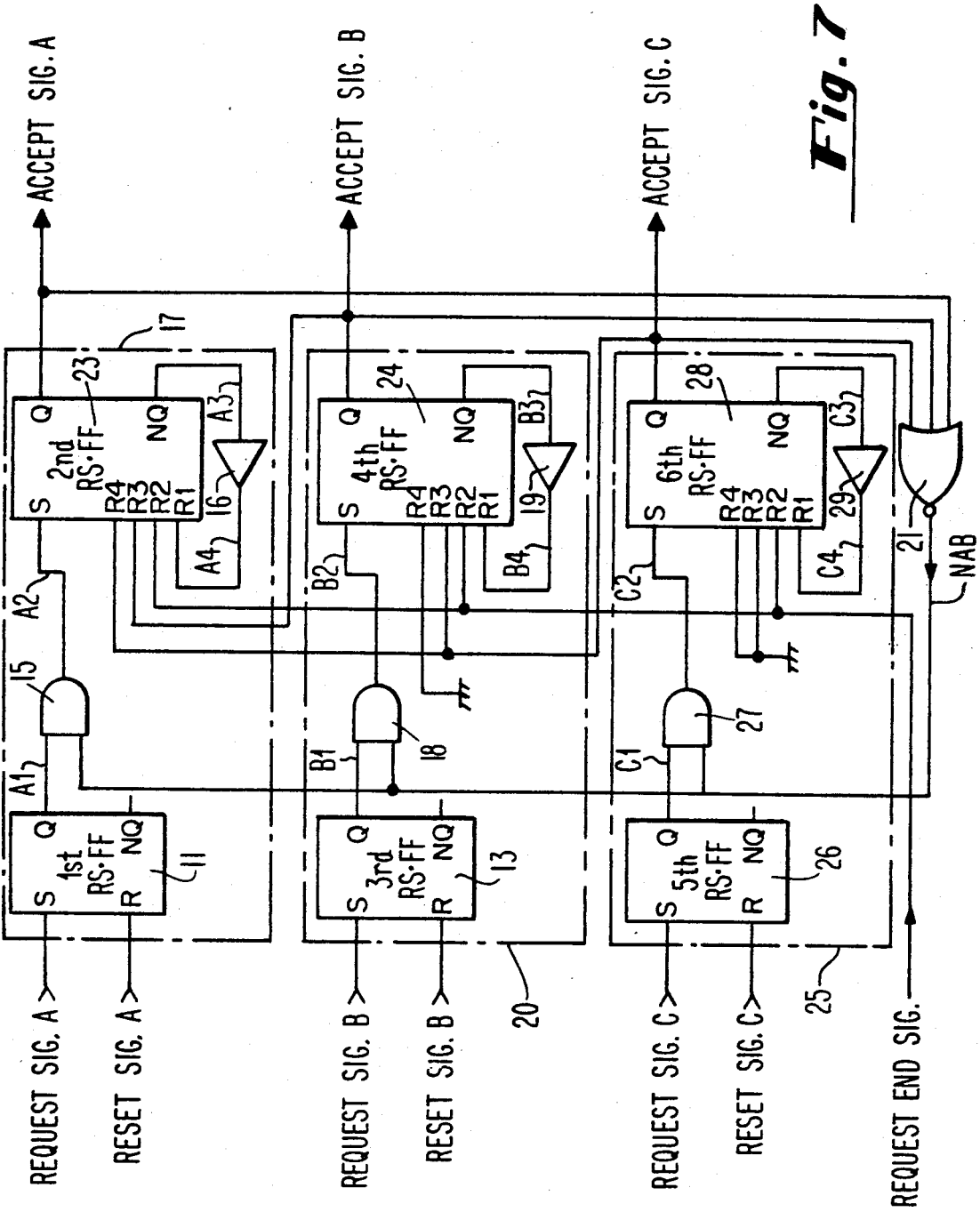
FIG. 7 is a block diagram of an arbiter circuit in a thrid embodiment of the invention.

FIG. 7 is a block diagram of an arbiter circuit in a third embodiment of the invention. In FIG. 7, the blocks having substantially equivalent functions to those in FIG. 2 and FIG. 6 are identified with the same reference numbers as; in FIG. 2 and FIG. 6, and their explanations are not repeated.

FIG. 7 shows an arbiter circuit for settling competition of request signals A, B and C. In FIG. 7, characteristically, the second RS flip-flop 23 is composed of 4R-RS flip-flop, that is, an RS flip-flop having four reset input terminals R1 to R4. The fourth RS flip-flop 24 is also composed of 4R-RS flip-flop. Furthermore, a third latch circuit 25 is added, and the third latch circuit 25 is composed of a fifth RS flip-flop 26 composed of 1R-RS flip-clop, a third AND gate 27, a sixth RS flip-flop 28 composed of 4R-RS flip-flop, and a third delay circuit 29 connected between the output terminal NQ and reset input terminal R1 of the sixth RS flip-flop 28. The accept signal B is supplied to the reset input terminal R3 of the second RS flip-flop 23, and the accept signal C is supplied to the reset input terminal R4 of the second RS flip-flop 23 and the reset input terminal R3 of the fourth RS flip-flops 24. Meanwhile, the reset input terminal R4 of the fourth RS flip-flop 24, and the reset input terminals R3, R4 of the sixth RS flip-flop 28 are grounded.

According to the composition in FIG. 7, the configuration of three request signals A, B and C may be settled substantially in the same, principle as in the arbiter circuits shown in FIG. 2 and FIG. 6.

Figure 8:
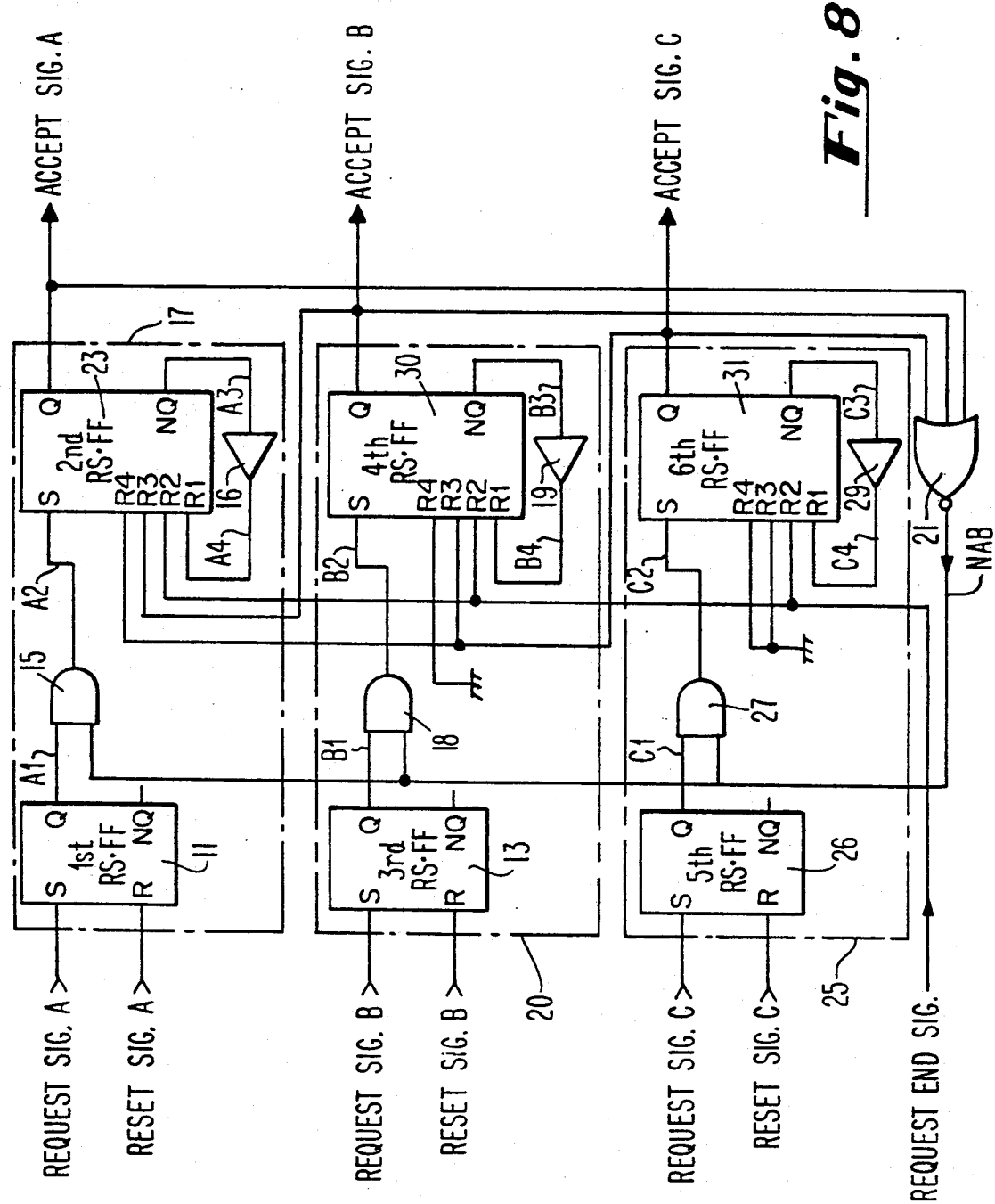
FIG. 8 is a block diagram of an arbiter circuit in a fourth embodiment of the invention.
Figure 9:
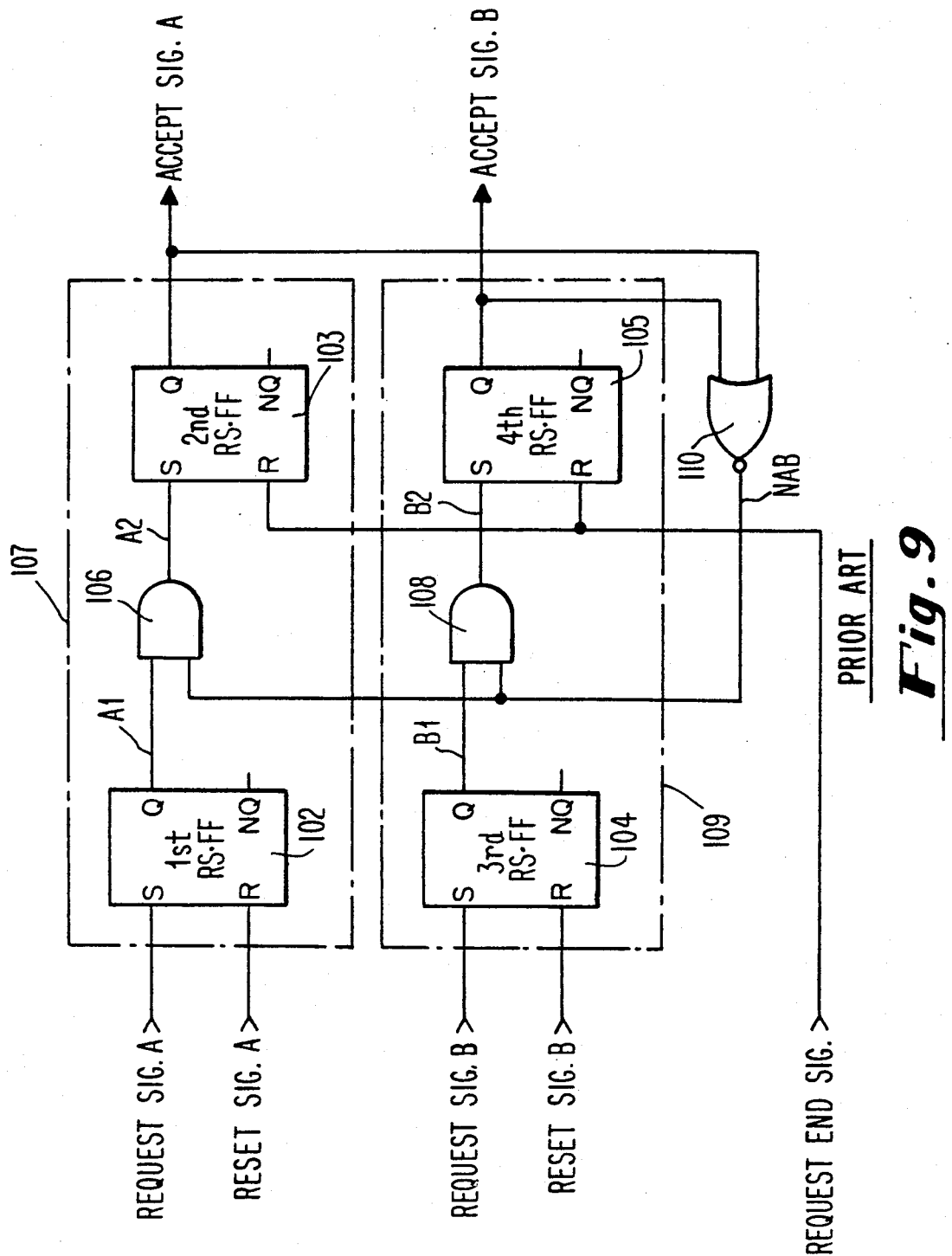
FIG. 9 is a block diagram of a conventional arbiter circuit.
Figure 10:
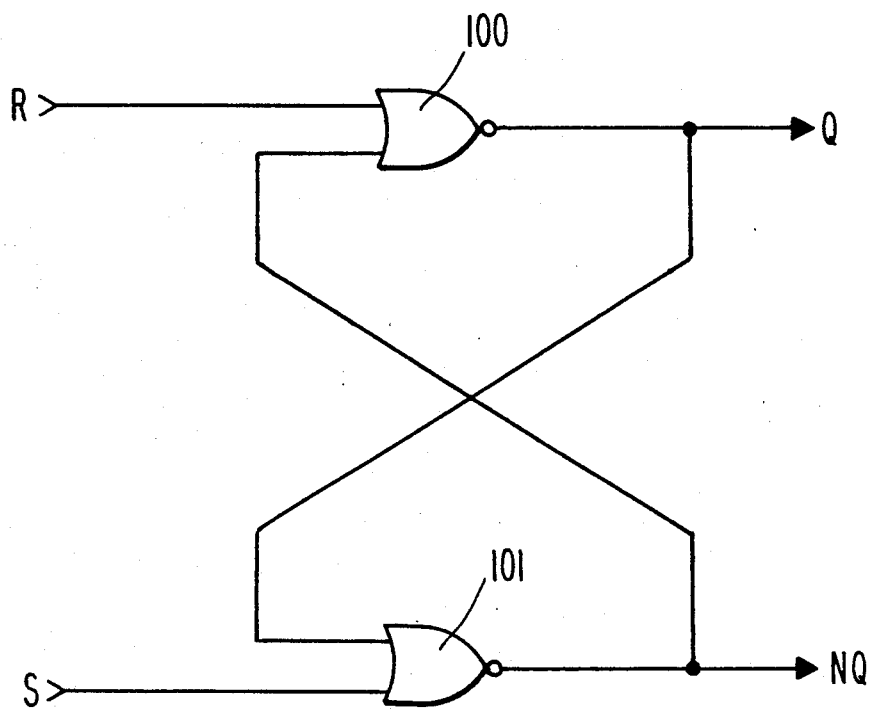
FIG. 10 is a block diagram showing an RS flip-flop used in the conventional arbiter circuit in FIG. 9.

FIG. 8 is a block diagram showing an arbiter circuit in a fourth embodiment of the invention. In FIG. 8, the blocks having substantially equivalent functions as those in FIG. 7 are identified with same reference numbers as in FIG. 7, and their explanations are not repeated.

In FIG. 8, what is different from FIG. 7 is that the fourth RS flip-flop 30 is composed of a 3R-RS flip-flop and that the sixth RS flip-flop, 31 is composed of a 2R-RS flip-flop. In such a configuration, too, the competition of three request signals A, B and C can be settled.

Meanwhile, as is clear from the description herein, by adding the fourth, fifth, sixth or more latch circuits sequentially, the competition of four or more request signals may be settled.

The relationship of the number of request signals, latch circuits and the number of reset input terminals of the RS flip-flop comprising each latch circuit is conceptually shown in Table 1.

TABLE 1

| Request signal | Latch circuit | RS flip-flop of each latch circuit | |
|---|---|---|---|
| 2 | A | 1st | 1R-3R 1R-3R |

TABLE 1-continued

| Request signal | Latch circuit | RS flip-flop of each latch circuit | |
|---|---|---|---|
|  | B | 2nd | 1R-3R | 1R-2R |
|  |  |  | (FIG. 2) | (FIG. 6) |
| 3 | A | 1st | 1R-4R | 1R-4R |
|  | B | 2nd | 1R-4R | 1R-3R |
|  | C | 3rd | 1R-4R | 1R-2R |
|  |  |  | (FIG. 7) | (FIG. 8) |
| 4 | A | 1st | 1R-5R | 1R-5R |
|  | B | 2nd | 1R-5R | 1R-4R |
|  | C | 3rd | 1R-5R | 1R-3R |
|  | D | 4th | 1R-5R | 1R-2R |

In the foregoing embodiments, examples of adjusting the data write request and read request in a memory circuit are demonstrated, but the invention may also be applied to applications other than a memory circuit.

We claim:

1. An arbiter circuit comprising:
   (a) a first latch circuit to which a first request signal is supplied, containing an input stage RS flip-flop possessing a set input terminal to which said first request signal is supplied and a reset input terminal to which a first reset signal is supplied, and an output stage RS flip-flop possessing a set input terminal, first and second output terminals and at least three reset input terminals;
   (b) a second latch circuit to which a second request signal is supplied, containing an input stage RS flip-flop possessing a set input terminal to which said second request signal is supplied and a reset input terminal to which a second reset signal is supplied, and an output stage RS flip-flop possessing a set input terminal, first and second output terminals and at least two reset input terminals;
   (c) means for controlling the transmission of signals from said input stage RS flip-flops of said first and second latch circuits to said set input terminals of said output stage RS flip-flops, according to signals of said first output terminals of said output stage flip-flops of said first and second latch circuits;
   (d) means for feeding said signal of said first output terminal of said output stage RS flip-flop of said second latch circuit to a first reset input terminal of said output stage RS flip-flop of said first latch circuit;
   (e) a first delay circuit connected between said second output terminal and a second reset input terminal, of said output stage RS flip-flop of said first latch circuit;
   (f) a second delay circuit connected between said second output terminal and a first reset input terminal, of said output stage RS flip-flop of said second latch circuit; and
   (g) means for feeding a common reset signal to a third reset input terminal of said output stage RS flip-flop of said first latch circuit, and a second reset input terminal of said output stage RS flip-flop of said second latch circuit.

2. An arbiter circuit according to claim 1, wherein the delay time of said first and second delay circuits is set longer than the delay time from the supply of signals to said set input terminals of said output stage RS flip-flops of said first and second latch circuits until said signals are latched in said first and second output terminals of said output stage RS flip-flops.

3. An arbiter circuit according to claim 1, wherein said first and second request signals are a write request and a read request signal in a dynamic random access memory device.

4. An arbiter circuit comprising:
   (a) a first latch circuit to which a first request signal is supplied, said first latch circuit containing an input stage RS flip-flop possessing a set input terminal to which said first request signal is supplied and a reset input terminal to which a first reset signal is supplied, and an output stage RS flip-flop possessing a set input terminal, first and second output terminals and at least four reset input terminals;
   (b) a second latch circuit to which a second request signal is supplied, containing an input stage RS flip-flop possessing a set input terminal to which said second request signal is supplied and a reset input terminal to which a second reset signal is supplied, and an output stage RS flip-flop possessing a set input terminal, first and second output terminals and at least three reset input terminals;
   (c) a third latch circuit to which a third request signal is supplied, containing an input stage RS flip-flop possessing a set input terminal to which said third request signal is supplied and a reset input terminal to which a third reset signal is supplied, and an output stage RS flip-flop possessing a set input terminal, first and second output terminals and at least two reset input terminals;
   (d) means for controlling the transmission of signals from said input stage RS flip-flops of said first, second and third latch circuits to said set input terminals of said output stage RS flip-flops, according to signals of said first output terminals of said output stage RS flip-flops of said first, second and third latch circuits;
   (e) means for feeding said signal of said first output terminal of said output stage RS flip-flop of said second latch circuit to a first reset input terminal of said output stage RS flip-flop of said first latch circuit;
   (f) means for feeding said signal of said first output terminal of said output stage RS flip-flop of said third latch circuit to said second reset terminal of said output stage RS flip-flop of said first latch circuit and a first reset input terminal of said output RS flip-flop of said second latch circuit;
   (g) a first delay circuit connected between said second output terminal and a third reset input terminal of said output stage RS flip-flop of said first latch circuit;
   (h) a second delay circuit connected between said second output terminal and a second reset input terminal of said output stage RS flip-flop of said second latch circuit;
   (i) a third delay circuit connected between said second output terminal and a first reset input terminal of said output stage RS flip-flop of said third latch circuit; and
   (j) means for feeding a common reset signal to a fourth reset input terminal of said output stage RS flip-flop of said first latch circuit, a third reset input terminal of said output stage RS flip-flop of said second latch circuit, and a second reset input terminal of said third latch circuit.

5. An arbiter circuit according to claim 4, wherein the delay time of said first, second and third delay circuits is set longer than the delay time from the supply of signals to said set input terminals of said output stage RS flip-flops of said first, second, and third latch circuits until said signals are latched in said first and second output terminals of said output stage RS flip-flops.

6. An arbiter circuit according to claim 4, wherein any one of said first, second and third request signals is a write request signal, another one is a read request signal, and the other one is a refresh request signal of a dynamic random access memory device.

7. An arbiter circuit comprising:
   (a) plural latch circuits and plural request signals in the same number, each latch circuit of said plural latch circuits containing an input stage RS flip-flop possessing a set input terminal to which said request signal is supplied, and a reset input terminal to which a reset signal is supplied, and an output signal RS flip flop possessing a set input terminal, first and second output terminals and plural reset input terminals;
   (b) means for controlling the transmission of signals from said input stage RS flip-flops to said set input terminals of said output stage RS flip-flops of said latch circuits, according to signals of said first output terminals of said output stage RS flip-flops of said latch circuits;
   (c) means for feeding said signal of said first output terminal of said output stage RS flip-flop of a specified latch circuit out of said plural latch circuit, to a reset input terminal of said output stage RS flip-flop of the other latch circuit;
   (d) plural delay circuits connected between said second output terminal and a reset input terminal of each said output stage RS flip-flop, respectively; and
   (e) means for feeding a common reset signal to the other reset input terminals of said output stage RS flip-flops.

8. An arbiter circuit according to claim 7, wherein the delay time of said delay circuits is set longer than the delay time from the supply of signals to said set input terminals of said output stage RS flip-flops until said signals are latched in said first and second output terminals of said output stage RS flip-flops.

* * * * *

UNITED STATES PATENT AND TRADEMARK OFFICE
CERTIFICATE OF CORRECTION

PATENT NO. : 5,065,052
DATED : November 12, 1991
INVENTOR(S) : Masahiko Sakagami and Hideki Kawai It is certified that error appears in the above—identified patent and that said Letters Patent is hereby corrected as shown below:

Column 7, line 40, before "in", change "composition" to --configuration--;

lines 40 and 41, change "configu-ration" to --competition--; and line 42, after "same" delete ",".

Signed and Sealed this

Sixteenth Day of March, 1993

Attest:

STEPHEN G. KUNIN

Attesting Officer    Acting Commissioner of Patents and Trademarks